United States Patent [19]
Wild

[11] Patent Number: 5,923,807
[45] Date of Patent: Jul. 13, 1999

[54] STORAGE APPARATUS FOR OPTICAL FIBER

[75] Inventor: Ronald L. Wild, Hamilton, Ind.

[73] Assignee: Lucent Technologies Inc., Murray Hill, N.J.

[21] Appl. No.: 08/812,259

[22] Filed: Mar. 6, 1997

[51] Int. Cl.⁶ ..................................................... G02B 6/00
[52] U.S. Cl. ......................................................... 385/135
[58] Field of Search .................................... 385/134, 135

[56] References Cited

U.S. PATENT DOCUMENTS

| 4,792,203 | 12/1988 | Nelson et al. | 385/135 |
|---|---|---|---|
| 4,798,432 | 1/1989 | Becker et al. | 385/135 |
| 4,886,336 | 12/1989 | Deusser et al. | 385/135 |
| 5,013,121 | 5/1991 | Anton et al. | 385/135 |
| 5,206,927 | 4/1993 | Finzel et al. | 385/135 |
| 5,511,144 | 4/1996 | Hawkins et al. | 385/135 |
| 5,647,045 | 7/1997 | Robinson et al. | 385/135 |

OTHER PUBLICATIONS

New Directions in Fiber Optic Splice Storage, Wesley W. Jones d Gary S. Cobb, AT&T Bell Laboratories, Norcross, Georgia, Nov. 1993.
Fiber and Copper Connectivity Solutions, BICSI News, Jun. 1996/7.

Primary Examiner—Rodney Bovernick
Assistant Examiner—Ellen E. Kang

[57] ABSTRACT

The present invention provides an optical fiber buffer loop management system which may be incorporated into a conventional interconnection box and which comprises one or more spools or pins around which optical fiber buffer loops are loosely dressed. Strategically placed cover guards forming narrow insertion slots for the fibers are attached to the tops of the spools or pins to prevent the fibers from unraveling. By loosely dressing the fiber loops in the interconnection box, no excess slack exists in the portion of the loop running from the spool to the point at which the plug connector on the end of the buffer loop is connected to the coupling located inside of the interconnection box. Preferably, each of the buffer loops is loosely wrapped about two spools in a figure-of-eight configuration, which allows a buffer loop density approximately four times greater than that of the prior art systems to be achieved without bending the fibers beyond their minimum bend radii. By loosely retaining the buffer loops in the interconnection box, as opposed to wrapping them tautly, the buffer loops can be easily unraveled when repairs are to be made. The present invention also provides a method for replacing faulty plug connectors. In order to replace a faulty plug connector, the plug connector is removed from the coupling device in the interconnection box and the optical fiber is cut so as to separate the plug connector from the optical fiber. The optical fiber is then removed from around the spool or spools and a new plug connector is then secured to the optical fiber. The new plug connector is then connected to the coupling device. The buffer loop is then wrapped about the spools in a figure-of-eight configuration as discussed above.

14 Claims, 1 Drawing Sheet

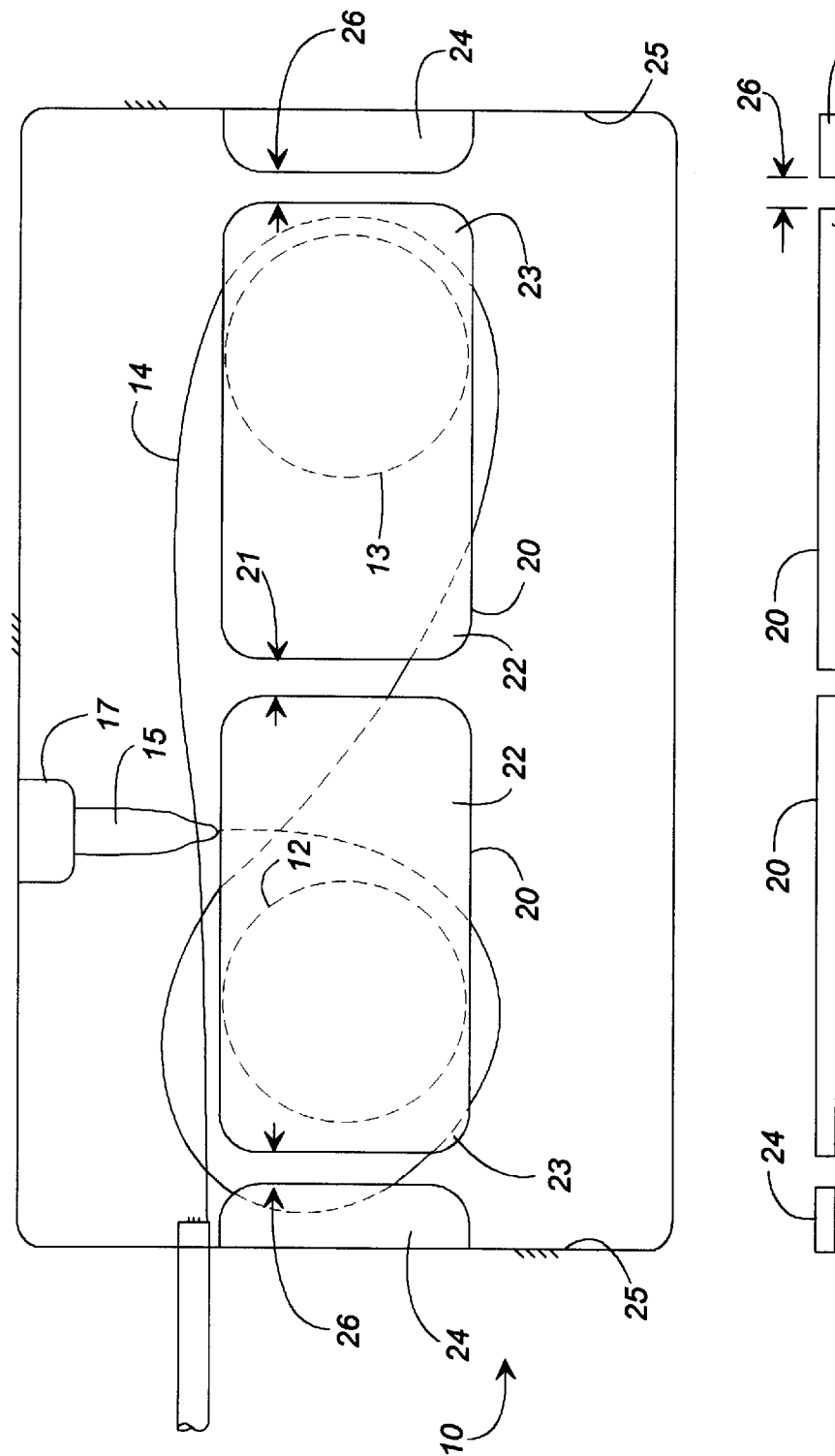

STORAGE APPARATUS FOR OPTICAL FIBER

TECHNICAL FIELD OF THE INVENTION

The present invention relates to an optical fiber buffer loop management system and, more particularly, to a storage apparatus for optical fibers.

BACKGROUND OF THE INVENTION

The use of communication cables which include a plurality of optical fibers is rapidly expanding. An optical fiber cable may comprise a plurality of glass fibers each of which is protected by at least one layer of a coating material. The optical fibers may be assembled into units in which the fibers are held together by binder ribbons or tubes to provide a core. Another optical fiber cable core includes a ribbon-type optical fiber arrangement in which a plurality, such as twelve fibers, for example, are arrayed together side by side. A plurality of these ribbons may be stacked to obtain a high fiber count cable. The core is enclosed by a plastic core tube and a plastic jacket.

Whatever the structure of a cable, there must be provisions for splicing transmission media at an end of a given length of cable to corresponding transmission media at an adjacent end of another length of cable. In wire-like metallic conductor communication practice, it is conventional to use a splice closure, within which strength members of the cable ends may be anchored and all conductors spliced, wrapped and stored, and protected environmentally. During the splicing of metallic conductors, it is customary to sharply bend the conductors to provide access to other connections.

The physical nature of glass optical fibers prevents the use of splicing techniques which are used with metallic conductors within such a splice closure. Because of their small size and relative fragility, special considerations must be given to the handling of optical fibers in closures. Transmission capabilities may be impaired if an optical fiber is bent beyond an allowable bending radius, the point at which light no longer is totally contained in the core of the fiber. Furthermore, fibers are brittle and their expected lives will be reduced if bent more than the minimum bending radius. Generally, the radius at which the optical fiber can be bent without affecting orderly transmission is substantially greater than that radius at which the optical fiber will break. Whereas glass and silica, the materials used to make optical fibers, are stronger than steel in some respects, optical fibers normally do not possess this potential strength because of microscopic surface fractures, which are vulnerable to stress and spread and which cause the fiber to break easily.

It should be clear that optical fiber cable does not lend itself to the splicing practices of wire-like communication conductors. The individual glass fibers cannot merely be twisted, tied, wrapped and moved into a splice closure, as is the usual practice with wire-like metallic conductor cables. These small-diameter glass fibers cannot be crimped or bent at small angles, without breakage. Due to the fact that glass fibers have memory and tend to return to a straight line orientation, placement in a splice closure becomes somewhat difficult. Moreover, the interconnection of optical fibers is a precision operation which, in the past, has tended to discourage the performance of splicing operations within areas such as a manhole, a duct, or a pole-suspension elevation. And yet, to do otherwise becomes more expensive.

These problems are particularly acute in multifiber cables because individual optical fibers must be spliced in a manner which allows repairs and rearrangements to be made in the future. In addition, fiber slack normally must be provided adjacent to the splices. The need to store the slack further complicates the problem of providing a suitable optical fiber closure.

When splicing optical fibers by fusion or by mechanical means, it becomes necessary to provide enough slack fiber so that the fiber can be pulled out of the splice case for the preparation of fiber ends and the joining together. This requires at least about 0.5 meters of fiber from each cable to be stored inside of the splice closure once the splicing is completed and the closure is sealed. This slack forms what is commonly referred to as the fiber loop. For a multifiber cable, some method of storing the fiber loop, of protecting the splice and of keeping the fiber loops together in an orderly manner is required. The splices should be easily accessible to facilitate the rearrangement of the optical fibers and splices as well as repairs.

A fiber communications interconnection box, commonly known as a zone wiring box, is a strain relief and splice closure used to convert from a large cable containing a large quantity of individual optical fibers into the individual optical fiber communication paths provided by each optical fiber. The interconnection boxes may be used, for example, in a large business office which has many terminations for providing separate communication paths for various purposes. When terminating each optical fiber, a length of buffer fiber approximately one meter in length is exposed by stripping back the cable sheath in order to provide a termination of the cut fiber with a plug connector. After the plug connector is secured to the cut end of the optical fiber, the plug connector is inserted into a coupling on the inside of the interconnection box. When the plug connector is inserted into the coupling, a loop of buffered fiber is formed, which is referred to herein as a buffer loop. Each fiber has a buffer loop and the management of these loops inside of a typical interconnection box is difficult.

Prior art interconnection boxes contain spools around which the buffer loops are wrapped in a circular fashion. One problem with these systems is that, when the loops are wrapped around the spools, the length of the fiber forming the loop generally does not match an integral number of revolutions around the spool. As a result, unraveling may occur due to loosening. This problem is exacerbated when a large number of buffer loops are managed within a small area, which normally is the case. Furthermore, in most cases the spools must have a radius equal to or greater than approximately 0.75 inches to prevent the fibers from being bent into too small of a radius. Another problem with these systems is that the buffer loops generally are wrapped snugly about the spools. Since each spool typically holds several fiber loops, unwrapping the loops from the spools when repairs need to be made is difficult.

Below et al. discloses an optical fiber interconnection system which is a patch panel for interfacing optical fibers with optoelectronic equipment which converts the optical information into electrical information. The patch panel includes a tray means for supporting a coiled bundle of fibers, and clips mounted on the tray means for retaining the coiled portions of the fibers within the patch panel. Cable supports extending from the front surface of the patch panel limit the bending radii of the coiled fibers. One of the disadvantages of the system disclosed in Below et al. is that the excess fiber retained within the patch panel generally will not have lengths equal to an integer number of coils around the tray means, which may result in excess fiber that is not retained by the clips and thus, poor management of the fiber loops within the patch panel.

Accordingly, a need exists for an optical fiber loop management system which is capable of handling a large number of buffer loops and which overcomes the deficiencies of prior art optical fiber loop management systems.

SUMMARY OF THE INVENTION

The present invention provides a storage apparatus for optical fibers comprising a housing having at least a bottom panel, at least two pins or spools for defining a path about which an optical fiber can be wrapped. Each of the pins has a lower end which is attached to the bottom panel. A guard is attached to the upper end of each of the pins. The guards attached to adjacent pins are separated from each other by a relatively narrow slit which is larger than the diameter of an optical fiber so that an optical fiber can be inserted through the slit. Once an optical fiber has been inserted through the slit and wrapped about the pins, the guards assist in preventing the optical fiber from unraveling.

The fibers preferably are wrapped about the pins in a figure-of-eight or serpentine configuration, although the configuration in which the fibers are wrapped is not critical to the present invention. Strategically placed cover guards are attached to the tops of the spools or pins to assist in preventing the fibers from unraveling. The guards attached to adjacent spools are separated from each other by a relatively narrow slot. In order to wrap fibers about the spools or pins, the fibers are first inserted through the narrow slot and then wrapped about the spools or pins. By making the slots just wide enough for the fibers to be inserted through them, the fibers can be maintained in a loose configuration while preventing or eliminating the possibility of the fibers backing out through the slots and unraveling. The slots have a width ranging from approximately $1/16^{th}$ of an inch to approximately $1/4$ of an inch. Preferably, the width of the slots is approximately $1/8^{th}$ of an inch.

Since the buffer loops are loosely wrapped, no excess slack is provided in the portion of the buffer loop running from the spool or pin to the coupling attached to the inside of the interconnection box. Also, by retaining the buffer loops loosely in the interconnection box, as opposed to retaining them tautly, any one buffer loop can easily be reverse-dressed without unraveling the others when repairs are to be made. Furthermore, by wrapping the fiber loops in a figure-of-eight or serpentine configuration, as opposed to a circular configuration, a buffer loop density approximately four times greater than that of the prior art systems is achieved without bending the fibers beyond their minimum bend radii.

The present invention also provides a method for replacing faulty plug connectors. In accordance with this embodiment, the plug connector is removed from the coupling device in the interconnection box and the optical fiber is cut so as to separate the plug connector from the optical fiber. The optical fiber is then removed from around the spool or spools by reverse-weaving and a new plug connector is secured to the optical fiber. The new plug connector is then connected to the coupling device. The buffer loop is then loosely wrapped or weaved about the spools or pins as discussed above.

BRIEF DESCRIPTION OF THE DRAWINGS

FIG. 1 and 2 are top and side views of an interconnection box having the buffer loop management system of the present invention in accordance with the preferred embodiment incorporated therein.

DETAILED DESCRIPTION OF THE INVENTION

FIG. 1 is a top view of a portion of an interconnection box having the buffer loop management system 10 of the present invention disposed therein. FIG. 1 illustrates a preferred embodiment of the present invention wherein the buffer loops are loosely wrapped around spools or pins 12, 13 in a figure-of-eight configuration. Prior to wrapping the buffer loops about the spools, each optical fiber is terminated by securing a plug connector 15 to the end of the optical fiber. The plug connectors 15 are then connected to optical fiber coupling devices 17 disposed inside of the interconnection box. When the plug connectors 15 are connected to the coupling devices 17, each optical fiber has a length of excess fiber stored inside of the interconnection box which forms the buffer loop 14. In accordance with a preferred embodiment of the present invention, the buffer loops are managed by wrapping them in one direction around one of the spools 12 and in the other direction around the other spool 13. The buffer loop is loosely wrapped, for example, around spool 12 in the clockwise direction and then around spool 13 in the counter clockwise direction, or vice versa. Cover guards 20 are attached to the tops of the spools 12, 13 to prevent unraveling of the buffer loops once they have been wrapped about the spools 12, 13. The cover guards typically are substantially thin and rectangular in shape and extend beyond the pins forming inner 22 and outer 23 flanges which help retain the optical fibers. The cover guards form narrow slots 21 of substantially contact width through which fibers are inserted into the buffer loop management system 10. In accordance with the preferred embodiment, the slots extend in a straight line perpendicular to the axes of the spools or pins 12,13. Alternatively, the slots can be curved or serpentine to further minimize the possibility of the fibers backing out and unraveling. The slots 21 have a width ranging from approximately $1/16^{th}$ of an inch to approximately $1/4$ of an inch. In addition, auxiliary guards 24 are provided on the end walls 25 of the box that extend inwardly towards the cover guards and form additional narrow slots 26 therewith. Preferably, the width of the slots 21 is approximately $1/8^{th}$ inch.

The installation procedure for installing an interconnection box comprising the buffer loop management system of the present invention will now be described in accordance with the preferred embodiment. The interconnection box is mounted to a mounting surface. Couplings such as, for example, M81SC simplex, M81SC duplex, M81ST or M81 LC duplex couplings, are then installed in the termination openings in the interconnection box. Preferably, twelve openings are provided in the interconnection box. Dust covers, preferably snap-in dust covers, are installed in the unused termination openings. The cable sheath is then stripped away to one meter from its end, exposing the individual color-coded buffered optical fibers. The cable is then attached to the interconnection box, preferably by means of a cable tie. Attaching the cable to the interconnection box prevents movement of the cable and relieves strain on the cable. The ends of each of the optical fibers is then terminated with a plug and each plug is inserted into a respective coupling socket, thus forming the buffer loops. The buffer loops are then dressed by loosely wrapping the loops around the spools in a figure-of-eight fashion starting at the ends having the plugs secured thereto. When the loops are almost fully dressed around the spools, just enough slack may be pulled from the loose pattern so that just enough of the loop remains for a complete rotation of the loop around alternate paths (i.e., circular shape around one spool, horse track shape around two spools, or weaved in a serpentine shape among two or more spools). In this way, no excess slack is left in the portion of the loop running from the spool to the point at which the plug connector is connected to the coupling. Once all of the buffer loops have been dressed, the interconnection box cover is attached.

The procedure for replacing an optical fiber termination after it has been installed will now be described. First, a determination is made as to which plug connector in the interconnection box is faulty. The faulty plug is then unplugged from its coupling inside of the interconnection box. The fiber is then cut at a location on the fiber adjacent the plug. The cut end of the fiber is then pushed and the fiber is traced to see where it leads upstream in the wrapped or weaved pattern, in a manner similar to that in which a knot in a rope is untied. These last two steps are repeated until enough of the fiber has been unwrapped to allow placement of a new plug connector on the end of the fiber. The new plug is then placed on the end of the fiber and the plug connector is inserted into the coupling. The fiber loop is then dressed in the manner described above and the cover is attached to the interconnection box.

It should be noted that the present invention is not limited to wrapping or weaving the buffer loops about the spools or pins in a figure-of-eight or serpentine configuration. The method of the present invention could also be accomplished by, for example, wrapping the buffer loops in a circular fashion around one relatively large circular spool or pin. In this case, the fiber loops will be loosely wrapped about the spool and the guards attached to the tops of the spools will prevent the loops from unraveling. Once the loops have been loosely wrapped about the spool, no excess slack remains in the portion of the loop running from the spool to the point at which the plug connector is plugged into the coupling. Alternatively, the present invention could be accomplished by loosely weaving the loops through several spools or pins in a serpentine configuration. Therefore, it should be clear that it is not the character of the means in the interconnection box around which the loops are wrapped that is critical, but rather the cooperation between the spools or pins and the cover guards forming narrow insertion slots which cooperate with the spools or pins to allow the loops to be loosely wrapped while preventing them from unraveling.

The present invention has been described in accordance with the preferred embodiments. However, the present invention is not limited to these embodiments. The present invention is not limited with respect to the number of fibers which may be connected to the interconnection box or with respect to the number of buffer loops which may be managed by the buffer loop management system of the present invention. It should also be noted that the present invention is not limited with respect to the types of connectors to be connected to the interconnection box. It will be apparent to those skilled in the art that modifications may be made to the method and apparatus of the present invention without deviating from the spirit and scope of the present invention.

What is claimed is:

1. A storage apparatus for optical fibers comprising:
    a housing having at least a bottom panel;
    at least two pins for defining a path about which an optical fiber can be wrapped, each of said pins having a lower end and an upper end, each of said pins having an axis, said lower ends being attached to said bottom panel; and
    a guard attached to the upper end of each of said pins, each guard having a top side and a relatively thin flange that extends from the top side of each guard towards the opposite pin and guard to form a gap between each flange and said bottom panel in which the optical fiber can be held, wherein said flanges of said guards are separated from each other by a relatively narrow slot, wherein said slot formed by said flanges is larger than the diameter of an optical fiber so that an optical fiber can be inserted through the slot, and wherein once an optical fiber has been inserted through the slot and wrapped about said pins, said guards assist in preventing the optical fiber from unraveling.

2. The apparatus of claim 1 wherein, in the length-wise direction, the slot extends perpendicular to the axes of said pins.

3. The apparatus of claim 1 wherein, in the length-wise direction, the slot is curved.

4. The apparatus of claim 1 wherein the slot has a width ranging from approximately $1/16^{th}$ of an inch to approximately $1/4^{th}$ of an inch.

5. The apparatus of claim 1 wherein the slot has a width of approximately $1/8^{th}$ of an inch.

6. The storage apparatus of claim 1, further comprising a pair of opposed end walls, wherein each guard extends outwardly from each of said pins to form outer flanges that extend toward an adjacent end wall.

7. The storage apparatus of claim 6
    wherein each of said opposed end walls is provided with an inwardly extending flange that extends towards an adjacent outer flange of said guards.

8. The storage apparatus of claim 7, wherein each of said inwardly extending flanges forms a further narrow slot with one of said outer flanges of said guards.

9. The storage apparatus of claim 1, wherein each of said guards is substantially thin and rectangular in shape.

10. The storage apparatus of claim 9, wherein a straight edge of each of said rectangular guards forms said relatively narrow slots.

11. The storage apparatus of claim 10, wherein said straight edges of said guards are substantially parallel such that said relatively narrow slots have a substantially constant width along the extent of said slots.

12. A method of replacing a faulty termination plug connector connected to a coupling device inside of an optical fiber communications interconnection box, wherein said coupling device is attached to the interconnection box, said method comprising the steps of:
    determining which of a plurality of termination connector plugs connected to coupling devices in the interconnection box is faulty;
    unplugging the faulty termination connector plug from the coupling device;
    cutting the optical fiber to form an end of the optical fiber and to separate the optical fiber from the termination connector plug;
    terminating the end the optical fiber with a second termination connector plug;
    attaching the second termination connector plug terminating the end of the optical fiber to the coupling device attached to the interconnection box, wherein when the second termination connector plug is attached to the coupling device, an optical fiber buffer loop is formed; and
    dressing the optical fiber buffer loop by loosely wrapping the optical fiber buffer loop about means disposed in the interconnection box, wherein said means retains the buffer loop in a loose pattern while preventing the buffer loop from unraveling.

13. The method of claim 12 wherein said means comprises a plurality of spools around which the fiber loop is loosely wrapped and guards attached to the top ends of said spools for preventing the optical fiber buffer loop from unraveling once it has been dressed, wherein guards attached to adjacent spools are separated by a relatively narrow slit, and wherein prior to wrapping the optical fiber buffer loop about the spools, the optical fiber buffer loop is inserted through the slits.

14. The method of claim 12 wherein said means comprises a plurality of spools, each of said spools having a radius equal to or greater than a minimum bend radius of the optical fiber buffer loop and wherein a guard is attached to the top end of each of said spools, wherein guards attached to adjacent spools are separated by a relatively narrow slit, and wherein the step of dressing the buffer loop includes inserting the buffer loop through the slit and loosely wrapping the buffer loop about one of said spools in a circular fashion and wherein the guards prevent the buffer loop from unraveling.

* * * * *